US009066384B2

(12) United States Patent
Kikuchi et al.

(10) Patent No.: US 9,066,384 B2
(45) Date of Patent: *Jun. 23, 2015

(54) LIGHT EMITTING DEVICE CONTROL CIRCUIT DEVICE AND CONTROL METHOD OF THE CONTROL CIRCUIT DEVICE

(71) Applicant: Rohm Co., Ltd., Kyoto (JP)

(72) Inventors: Hidekazu Kikuchi, Kyoto (JP); Akinobu Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,919

(22) Filed: Oct. 2, 2013

(65) Prior Publication Data

US 2014/0049179 A1 Feb. 20, 2014

Related U.S. Application Data

(63) Continuation of application No. 13/082,596, filed on Apr. 8, 2011, now Pat. No. 8,575,860.

(30) Foreign Application Priority Data

Apr. 9, 2010 (JP) ................................. 2010-089990

(51) Int. Cl.
*G05F 1/00* (2006.01)
*H05B 37/02* (2006.01)
*H05B 39/04* (2006.01)
*H05B 41/36* (2006.01)
*H05B 33/08* (2006.01)

(52) U.S. Cl.
CPC ........ *H05B 37/0281* (2013.01); *H05B 33/0824* (2013.01)

(58) Field of Classification Search
None
See application file for complete search history.

(56) References Cited

U.S. PATENT DOCUMENTS

| 7,948,468 | B2 | 5/2011 | Zane et al. | |
|---|---|---|---|---|
| 8,575,860 | B2 * | 11/2013 | Kikuchi et al. | 315/299 |
| 2005/0212459 | A1 | 9/2005 | Patel et al. | |
| 2008/0048573 | A1 | 2/2008 | Ferentz et al. | |

FOREIGN PATENT DOCUMENTS

| JP | 2001-343936 | 12/2001 |
|---|---|---|
| JP | 2008-091311 | 4/2008 |
| WO | 2006/137273 | 12/2006 |

* cited by examiner

*Primary Examiner* — Anh Tran
(74) *Attorney, Agent, or Firm* — Fish & Richardson P.C.

(57) ABSTRACT

The light emitting device control circuit device 100 in accordance with the disclosure includes a power source V1, a transistor TR1, a light emitting unit EU1, switches S1 to S17, constant current sources CC1 to CC17, and a controller 110. A switching voltage Vs1 is supplied from the controller 110 to turn ON or turn OFF the transistor TR intermittently, a pulse voltage is supplied to a pulse voltage supplying line Y1 connected to a drain terminal D of the transistor TR1. The driving signals SP1 to SP17 are sequentially supplied to the switches S1 to S17 to turn ON or turn OFF them (i.e., time division drive). The light emitting devices A1 to A17 are driven sequentially by a pulse current (i.e., time division drive) when a high voltage is supplied to the pulse voltage supplying line Y1 and when the driving signals SP1 to SP17 are turned ON.

11 Claims, 7 Drawing Sheets

LIGHT EMITTING DEVICE CONTROL CIRCUIT DEVICE AND CONTROL METHOD OF THE CONTROL CIRCUIT DEVICE

CROSS-REFERENCE TO RELATED APPLICATIONS

This application claims the benefit of priority of Japanese patent application No. 2010-89990 (filing date: Apr. 9, 2010), which is incorporated herein by reference in its entirety.

BACKGROUND OF THE INVENTION

1. Field of the Invention

This disclosure relates to a light emitting device control circuit device and a method to control the control circuit device which drives light emitting devices in a time-shifted manner with respect to one another (i.e., a ON-OFF timing of the light emitting devices is shifted with respect to one another) to avoid concentration of current consumption at predetermined timing, and to prevent noise caused by an increase of current consumption.

2. Description of Related Art

As for a semiconductor device well known as a light emitting device or a display device, a light emitting diode (LED) or an organic light emitting diode (OLED), and a laser diode (LD) are known. For example, the light emitting device can be used for a cell phone, a watch, a character display, an ornament, and so on.

Figure 5:
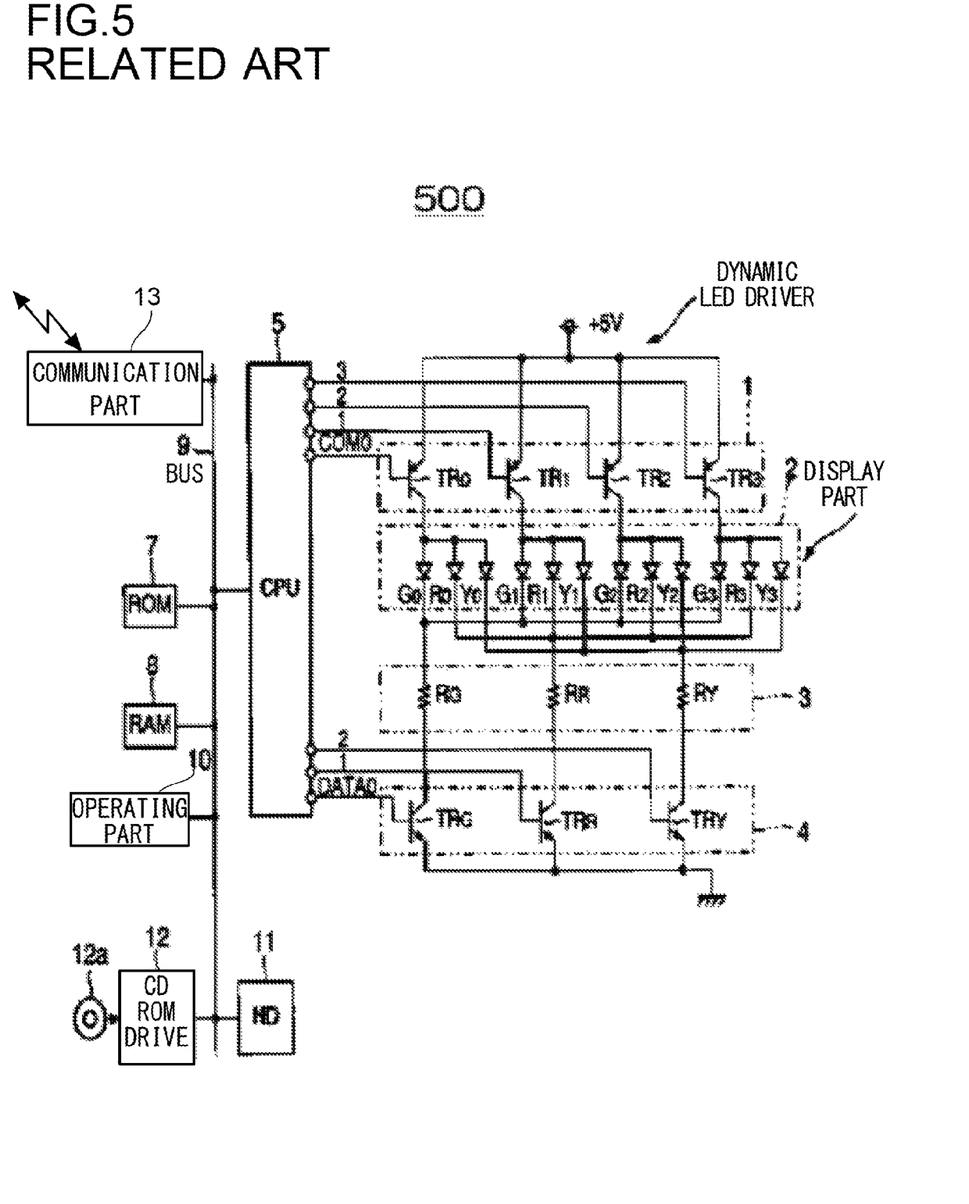
FIG. 5 illustrates an example of a dynamic LED driver used for an image creating device in accordance with the related art.

FIG. 5 illustrates an image creating device described in FIG. 1 of the first related art (Japanese publication number 2001-343936). As a display device of the image creating device, a dynamic LED driver constructed with a 4-by-3 LED matrix included in a manipulation panel, is illustrated. The dynamic LED driver illustrated in the first related art is a technique to reduce energy consumption of the manipulation panel using LEDs provided as a matrix.

In FIG. 5, the dynamic LED driver includes a common driver 1 consisting of four PNP transistors TR0 to TR3, LEDs 2 provided as a 4-by-3 matrix, current restriction resistors 3 to control a current flowing to LEDs for respective light emitting colors (i.e., green[G0, G1, G2, G3], red[R1, R1, R2, R3], and yellow[Y0, Y1, Y2, Y3]) and a data driver 4 consisting of three NPN transistors (TRG, TRR, TRY). The LEDs 2 are driven by a common driver 1 and a data driver 4.

The CPU 5 controls the image creating device. To drive the driving transistors designated by the two drivers (i.e., the common driver 1 and the data driver 4) sequentially on a time division basis, the CPU 5 provides driving signals to output ports COM0 to COM3 and output ports DATA0 to DATA2 in response to a predetermined condition. The CPU 5 is a central processing unit to control the entire image creating device including the LED dynamic driver, in response to a program stored in ROM (Read Only Memory) 7 and RAM (Random Access Memory) 8.

The emitter of each of the PNP transistors TR0 to TR3 of the common driver 1 is connected to a 5 voltage power source, and the collector of each of the PNP transistors TR0 to TR3 is provided to a corresponding position of the LEDs 2.

Bases of the PNP transistors TR0 to TR3 are connected to respective corresponding output ports COM0 to COM3 of the CPU 5. Time division driving signals are provided from the output ports COM0 to COM3. If the time division driving signals are at a high level, the PNP transistors TR0 to TR3 turns to OFF state. If the time division driving signals are at a low level, the PNP transistors turn to ON state.

The PNP transistors TRG, TRR, and TRY of the data driver 4 are provided correspond to respective light emitting colors. Emitter of each of the transistors is connected to a ground, and each collector of the transistors is connected to cathode of the corresponding color LEDs via current restriction resistors RG, RR, and RY. Bases of the transistors TRG, TRR, and TRY are connected to output ports DATA0 to DATA2 of CPU5. If the time division driving signals provided from the output ports DATA0 to DATA2 are at a low level, the transistors TRG, TRR, and TRY change to OFF state. If the time division driving signals provided from the output ports DATA0 to DATA2 are at a high level, the transistors TRG, TRR, and TRY change to ON state.

Therefore, if a base voltage of any one of the PNP transistors TRi (i=0 to 3) of the common driver 1 is at a low voltage, and if a base voltage of any one of the NPN transistors TRj (j=G,R,Y) of the data driver 4 is at a high voltage, then a current flows to the selected LED (a LED located at [i,j]) and the selected LED is driven (i.e., illuminate).

In the first related art, first and second driving means to drive the light emitting diodes provided as a matrix sequentially (i.e., time division drive) are disclosed. In other words, the first related art discloses the composition that has a LED matrix 2 is connected in series between the common driver 1 and the data driver 4.

Figure 6:
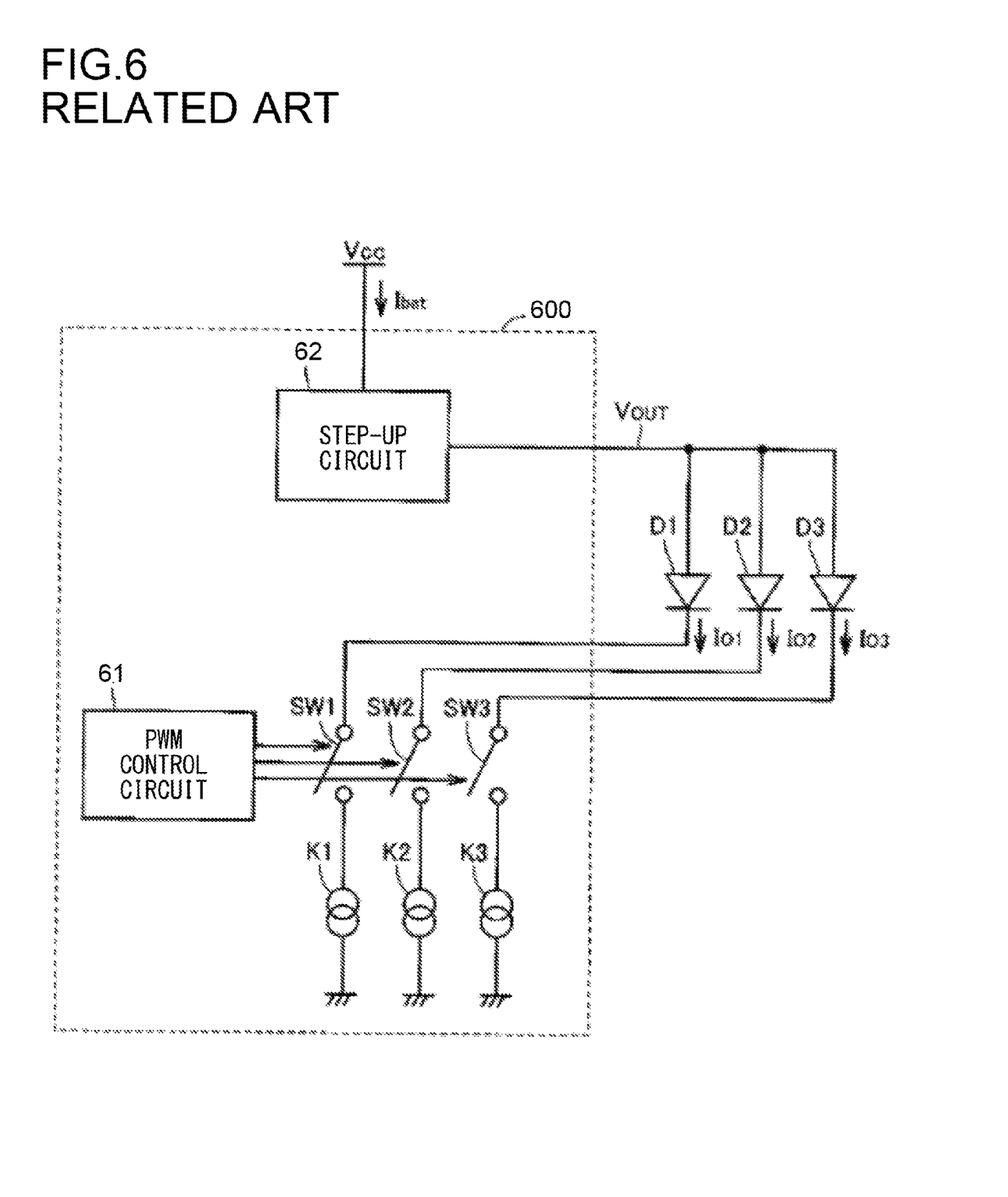
FIG. 6 illustrates an example of a light emitting control circuit in accordance with the related art.

FIG. 6 illustrates a light emitting control circuit referred to in FIG. 1 of the second related art (i.e., International publication number WO2006-137273 applied for by an applicant of this application). Symbols indicating components of the figure are modified for the present application. The light emitting control circuit 600 includes a PWM control circuit 61, a step-up circuit 62, switches SW1 to SW3, and the constant current drivers K1 to K3.

A characteristic of the light emitting control circuit 600 illustrated in FIG. 6 is summarized below. The light emitting control circuit 600 to drive multiple light emitting devices D1 to D3 includes current source circuits K1 to K3 which supply currents Io1 to Io3 to the light emitting devices D1 to D3. The light emitting control circuit 600 is provided correspond to the light emitting devices, and includes switches SW1 to SW3 corresponding to the light emitting devices. The switches SW1 to SW3 operate to connect or disconnect the current source circuits K1 to K3 to the respective light emitting devices D1 to D3. The light emitting control circuit 600 also includes a PWM control circuit 61. The PWM control circuit 61 supplies currents to the light emitting devices from the current source circuits intermittently by controlling the switches SW1 to SW3, and drives (i.e., switches a state from inactive to active) the light emitting devices in a time-shifted manner.

In the second related art (WO2006-137273), to supply a current to the light emitting devices D1 to D3, the switching from inactive state (the stop condition of the current supply) to active state (the start condition of the current supply) is performed in a time-shifted manner. Thus, same as the first related art, the second related art discloses a controller to drive the light emitting devices sequentially (i.e., time division drive).

Figure 7:
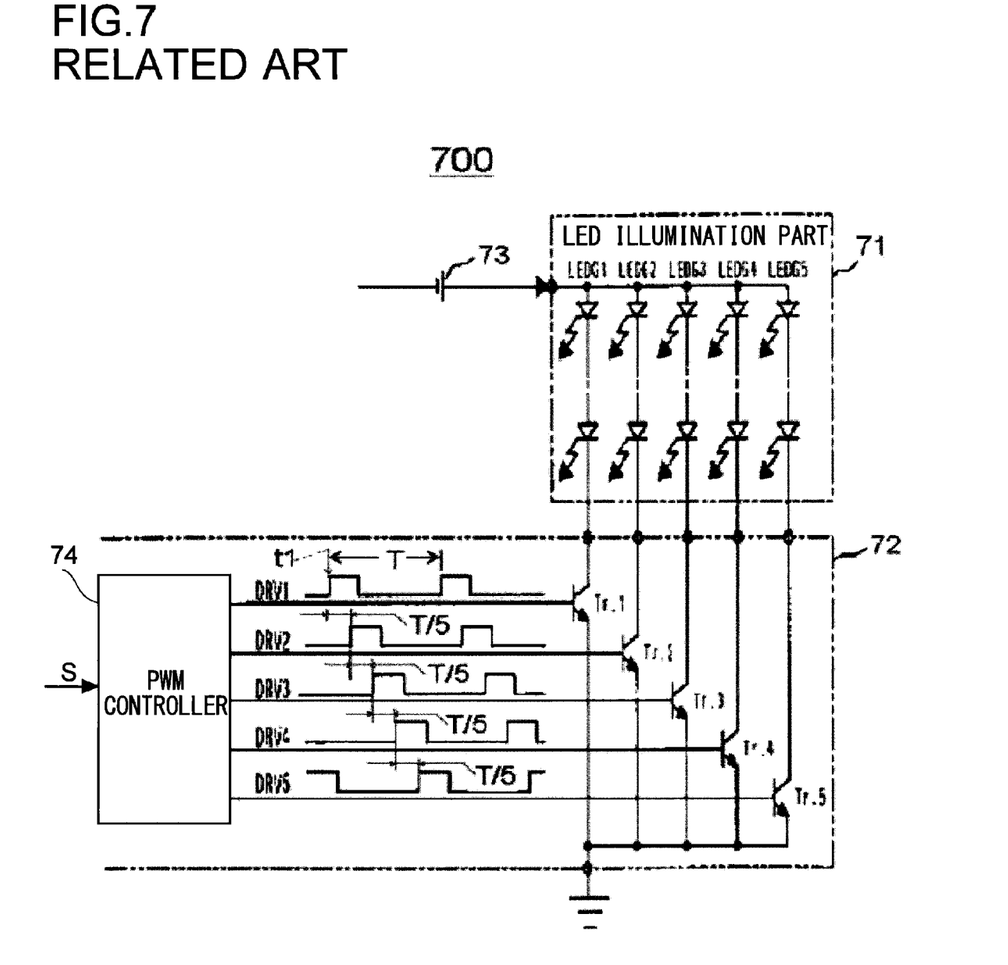
FIG. 7 illustrates an example of a LED driving device in accordance with the related art.

FIG. 7 illustrates a LED driving device shown in FIG. 1(a) of the third related art (Japanese publication number 2008-91311), symbols indicating components of the figure are modified and added, and a part of FIG. 1(b) of the third related art is added for the present application.

In the third related art (Japanese publication number 2008-91311), LEDs are used as a backlight of a LCD (Liquid Crystal Display) and illuminations, when driving the LEDs by pulse width signals to control a brightness, prevent noise caused by simultaneous drive of the LEDs connected in parallel with each other. The third related art also discloses a stable operation even when a sudden increasing of an illumination output is occurred.

In FIG. 7, the LED driving device 700 includes a LED illumination part 71, and a LED driving controller 72 to drive the LED illumination part 71. The LED illumination part 71 includes LED groups LEDG1 to LEDG5 connected in parallel with each other. Each of the LED groups consists of LEDs connected in series. A current is supplied from a power source 73 to the LED illumination part 71, and transistors Tr.1 to Tr.5 (as switching elements) are connected to respective ground terminals of the LED groups LEDG1 to LEDG5. These transistors Tr.1 to Tr.5 are driven by the driving signals DRV1 to DRV5 provided from the PWM (Pulse Width Modulate) controller 74 which provides driving pulses in response to a control direction signal S.

With respect to the PWM controller 74, if a control direction signal S to indicate an illumination brightness of the LEDs is provided to the PWM controller 74, the PWM controller 74 provides PWM driving signals DRV1 to DRV5 in response to the control direction signal S. The PWM controller 74 divides one cycle of a driving signal by the number of the LED groups, and outputs driving signals DRV1 to DRV5, respectively, in accordance with division. In FIG. 7, the number of the LED groups is five, so one cycle (T) of a driving signal is divided by five. The driving signal DRV1 to drive the transistor Tr.1 (i.e., the first transistor Tr.1 drives the LED group LEDG1) is raised at rise time t1. The driving signal DRV2 to drive the transistor Tr.2 (i.e., the second transistor Tr.2 drives the LED group LEDG2) is raised at a timing which is delayed T/5 compared to the rise time t1. The driving signal DRV3 to drive the transistor Tr.3 (i.e., the third transistor Tr.3 drives the LED group LEDG3) is raised at a timing which is delayed T/5 compared to the timing of the rising of the driving signal DRV2. The driving signal DRV4 to drive the transistor Tr.4 (i.e., the fourth transistor Tr.4 drives the LED group LEDG4) is raised at a timing which is delayed T/5 compared to the timing of the rising of the driving signal DRV3. The driving signal DRV5 to drive the transistor Tr.5 (i.e., the fifth transistor Tr.5 drives the LED group LEDG5) is raised at a timing which is delayed T/5 compared to the timing of the rising of the driving signal DRV4. Thus LEDs are driven sequentially (i.e., time division drive) in response to the number of the LED groups.

In the first related art (Japanese publication number 2001-343936), both the supplied voltage and current to the light emitting diode are driven sequentially (i.e., time division drive). However, driving the multiple light emitting diodes with a delay (i.e., a period of the delay equals a part of one cycle of the pulse current drive) with respect to each other is not described.

In the second related art (WO2006-137273), supplying a current to the light emitting device sequentially (i.e., time division drive) is disclosed. However, supplying both a current and a voltage to the light emitting device sequentially is not disclosed. Also a technique to control each of the light emitting devices provided as a matrix pattern is not disclosed.

In the third related art (Japanese publication number 2008-91311), a technique to supply a current to the light emitting device sequentially (i.e., time division drive) is disclosed. However, supplying both a current and a voltage sequentially to the light emitting device (i.e., time division drive) is not disclosed. Also a technique to control each of the light emitting devices provided as a matrix pattern is not disclosed.

The light emitting device control circuit device of the present disclosure makes it possible to reduce energy consumption, and to prevent noise caused by the on/off switching of the light emitting devices in specific timing. The light emitting device control circuit device shifts ON-OFF timings of the light emitting devices provided as a m by n matrix pattern, and avoids overlapping the ON-OFF timings with respect to each other. Thus, a light emitting device control circuit device and a method to control the device are provided to avoid concentration of a current in a same timing.

SUMMARY OF THE INVENTION

A light emitting device control circuit device includes
(a) multiple light emitting devices,
(b) multiple drive control lines to perform a pulse current drive for the multiple light emitting devices respectively with a predetermined interval, and
(c) a pulse voltage supplying line to supply a pulse voltage which changes to ON state or OFF state to the multiple light emitting devices.

The multiple light emitting devices are driven with a predetermined delay with respect to each other during the ON state of the pulse voltage supplying line, where a period of the delay equals part of one cycle of the pulse current drive.

This construction drives the light emitting devices sequentially with a predetermined delay (i.e., time division drive). Thus, noise caused by a concentration of current to drive multiple light emitting devices simultaneously can be prevented. In addition, as a voltage is supplied from the power source to the light emitting device only for a period to drive the light emitting device, superfluous energy consumption can be prevented.

In some implementations,
(a) the light emitting devices form a light emitting unit,
(b) multiple units are provided,
(c) the multiple pulse voltage supplying lines are provided in correspondence with the number of the light emitting units,
(d) the multiple light emitting devices forming the multiple light emitting units are mutually connected to respective corresponding drive control lines, the pulse voltages are sequentially supplied to the light emitting units with a predetermined delay from respective pulse voltage supplying lines.

With respect to a light emitting device control circuit device consisting of light emitting devices provided as a matrix pattern, this construction can prevent noise caused by a concentration of a current to drive the light emitting devices simultaneously. In addition, as a voltage is supplied from the power source to the light emitting device only for a period to drive the light emitting device, superfluous energy consumption can be prevented.

In some implementations,
(a) the multiple pulse voltage supplying lines and the multiple drive control lines are provided as a m by n matrix pattern (where m and n are integers equal to or greater than two),
(b) the light emitting devices are disposed at respective cross points between m rows of the pulse voltage supplying lines and the n columns of the drive control lines,
(c) pulse currents to perform the pulse current drive for the light emitting devices provided for the light emitting units are supplied to the respective n columns of the drive control lines.

With respect to a light emitting device control circuit device consisting of light emitting devices provided as a matrix pattern, this construction can prevent noise caused by a concentration of a current to drive the light emitting devices simultaneously. In addition, as a voltage is supplied from the power source to the light emitting device only for a period to drive the light emitting device, superfluous energy consumption can be prevented.

In some implementations, for controlling ON-OFF state of the multiple light emitting devices provided as a m by n matrix pattern (where m and n are integers equal to or greater than two), ON-OFF timings for the m by n light emitting devices are shifted with respect to each other for a predetermined period. This construction (control method) can shift a timing of current flowing through all of the light emitting devices composed of m by n matrix. Thus, a concentration of a pulse current to a specific timing can be prevented. Thus a swelling of noise can be prevented.

Other features, elements, steps, advantages, and characteristics will be apparent from the following description, the drawings and the claims.

DETAILED DESCRIPTION OF PREFERRED IMPLEMENTATIONS

Figure 1:
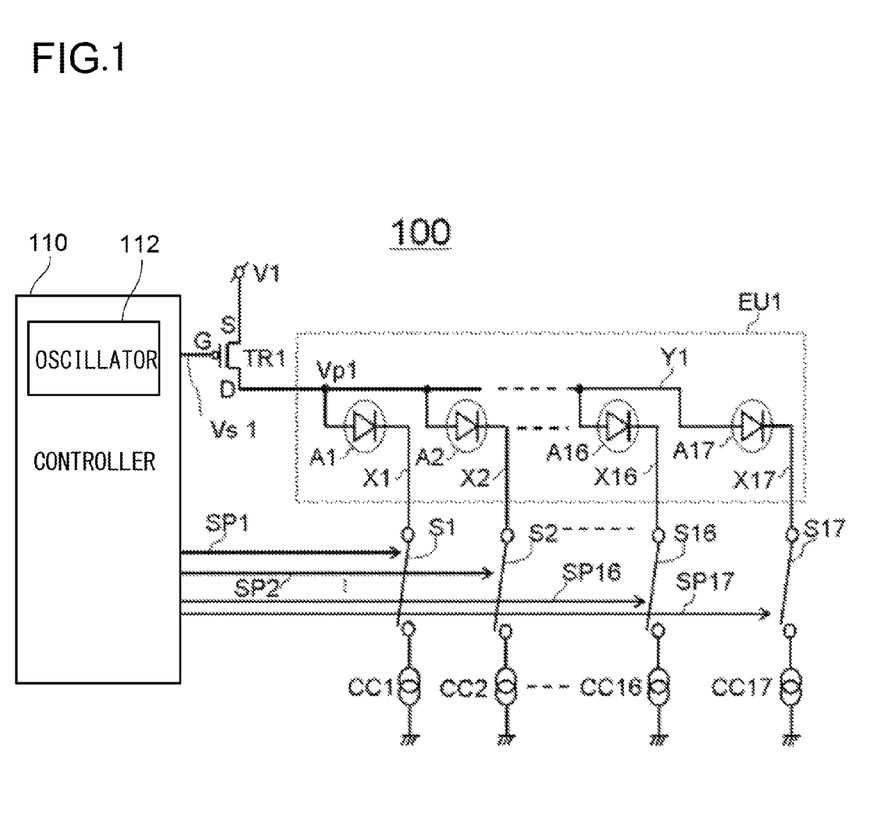
FIG. 1 illustrates a light emitting device control circuit device in accordance with a first implementation of the invention.

FIG. 1 illustrates a light emitting device control circuit device 100 in accordance with a first implementation of the disclosure. The light emitting device control circuit device 100 includes a light emitting unit EU1 that has light emitting devices A1 to A17, a power source V1, a transistor TR1, switches S1 to S17, constant current sources CC1 to CC17, and a controller 110. Components, except for the switches A1 to A17, are integrated as a semiconductor circuit. The light emitting devices A3 to A15, the switches S3 to S15, and the constant current sources CC3 to CC15 are not described in terms of the simplicity of the figure. The light emitting unit consists of multiple light emitting devices (the word "light emitting unit" is used to separate multiple light emitting devices as specific block). With respect to the first implementation, the light emitting unit consists of seventeen light emitting devices. The number of the light emitting devices is flexible (e.g., seven, ten, or twenty four).

The transistor TR1 consists of PMOS transistors, a source terminal S and a drain terminal D and a gate terminal G are respectively connected to a power source V1 and the light emitting unit EU1 and the controller 110.

The power source V1 is a DC voltage (e.g., 3V to 5.5V) and supplied to a source terminal S of the transistor TR1. A switching voltage Vs1, which alternates between a high voltage and a low voltage, is supplied to a gate terminal G of the transistor TR1 from the controller 110. If the switching voltage Vs1 is at a high level, then the transistor TR1 turns to OFF state. If the switching voltage Vs1 is at a low voltage, the transistor TR1 turns to ON state. The PMOS transistor TR1 can be substituted with a PNP bipolar transistor and can be driven in the same way as the PMOS transistor TR1 (i.e., the ON-OFF states of the transistors are same).

Anode terminals (i.e., first electrodes) of the light emitting devices A1 to A17 composing the light emitting unit EU1 are connected together, and the mutually connected node is connected to a drain terminal D of the transistor TR1. A pulse voltage supplying line Y1 is a voltage supplying line connected to a drain terminal D of the PMOS transistor TR1. As light emitting devices A1 to A17, LED or OLED or LD (i.e., a semiconductor device) can be used and preferable used with same kind of emitting devices (i.e., two of same kind of the light emitting devices can be connected in series or in parallel). A non-semiconductor device (i.e., a light bulb) can be used, though the semiconductor device is preferable in terms of miniaturization of the device.

A pulse voltage Vp1 is provided from a drain terminal D of the transistor TR1 (i.e., the polarity of the pulse voltage Vp1 is opposite that of the switching voltage Vs1 supplied to a gate terminal G of the transistor TR1). When the switching voltage Vs1 becomes a high level, the pulse voltage Vp1 becomes a low level. When the switching voltage Vs1 becomes a low level, the pulse voltage Vp1 becomes a high level. Thus, the light emitting devices A1 to A17 are illuminated when the pulse voltage Vp1 is at a high level.

Each cathode terminal (i.e., second electrode) of the light emitting devices A1 to A17 is respectively connected to the each first terminal of switches S1 to S17 via the driving control lines X1 to X17. The switches S1 to S17 respectively correspond to the light emitting devices A1 to A17 and are used to drive them. If a pulse voltage Vp1 of a high level is provided to a drain terminal D of the transistor TR1, not all light emitting devices are driven at the same time, only the light emitting device selected by the switch is driven by a pulse current. If the switch S1 is closed (=ON state) and other switches S2 to S17 are opened (=OFF state), then only the light emitting device A1 is driven by a pulse (=ON state), and the other light emitting devices A2 to A17 are not driven (=OFF state).

The ON-OFF switching of the switches S1 to S17 is controlled by the driving signals SP1 to SP17 provided from the controller 110. The driving signals SP1 to SP17 are pulse signals which alternate between a high level and a low level in the same manner as the switching voltage Vs1. The timing to become a high level from a low level and the timing to become a low level from a high level of the driving signals SP1 to SP17 are shifted with respect to each other. Thus, the switches S1 to S17 are driven sequentially (i.e., time division drive) by the driving signals SP1 to SP17. The driving signals SP1 to SP17 are PWM signals, and a pulse width of the signal is altered in response to the controller 110. The brightness of the light emitting devices A1 to A17 is controlled in accordance with a current flowing through the light emitting device driven by a pulse current drive, and a duty of the PWM signal. The duty of the PWM signal is controlled by the controller 110. For example, the duty is controlled from 1.6% to 100% by 1.6% step.

The constant current sources CC1 to CC17 are connected to each second terminal of the switches S1 to S17, respectively, and control a current flowing through each respective light emitting device A1 to A17. The value of the current is controlled by the controller 110 by mA (milliampere) steps.

The switching voltage Vs1 and the driving signals SP1 to SP17 (i.e., voltage and signals) are provided from the controller 110. A clock signal generated by an oscillator 112 of the controller 110 is processed by a frequency divider, a counter or a shift register, and a voltage, a frequency, a cycle or a duty is controlled. Thus the switching voltage Vs1 or the driving signals SP1 to SP17 are generated.

The light emitting unit EU1 consists of seventeen light emitting devices A1 to A17. If a LED is used as a light emitting device, such composition is referred as "17 channels LED driver". A number of the channels is flexible, 7 channels or 10 channels can be used in accordance with an application generally.

Figure 2:
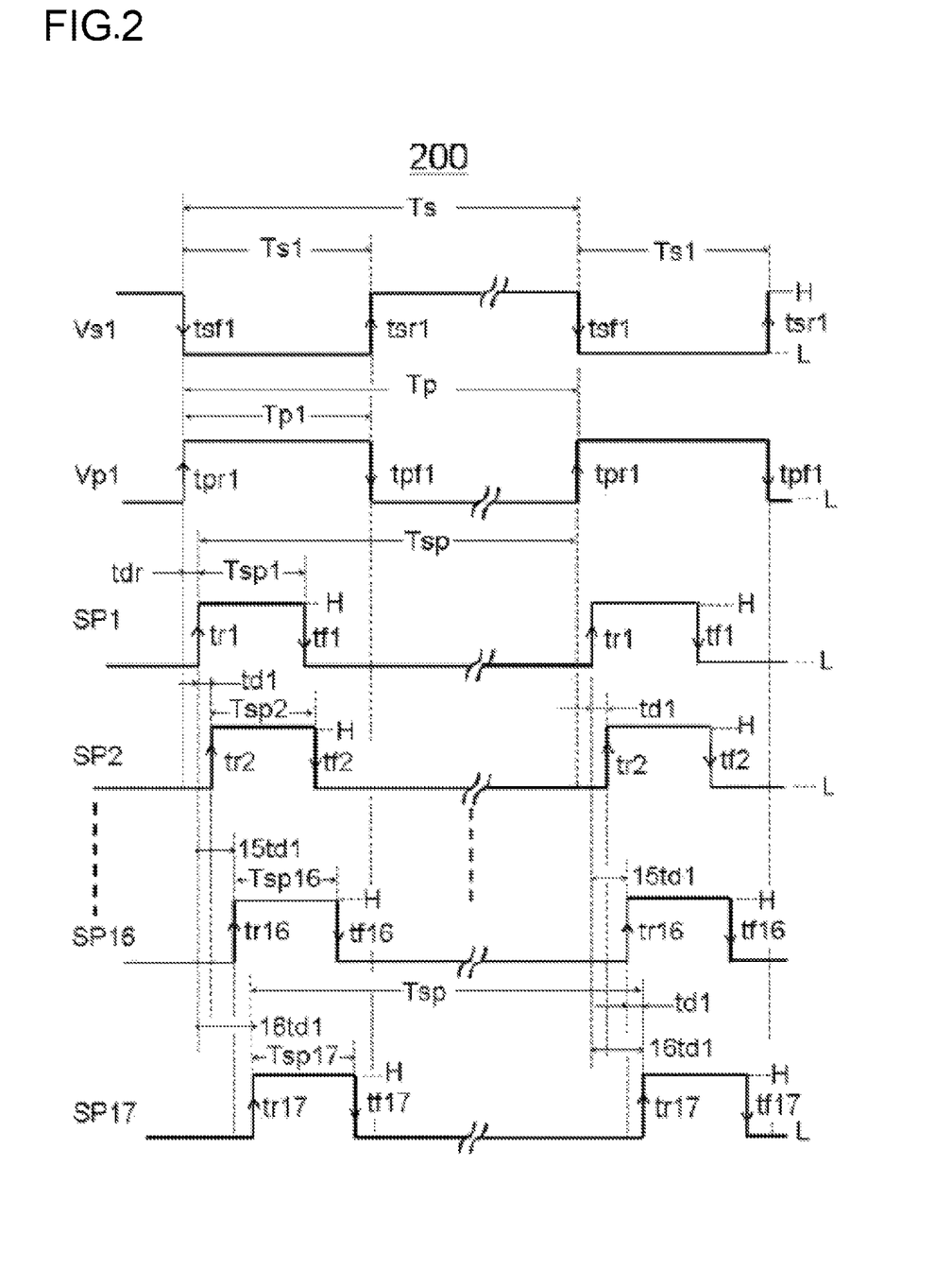
FIG. 2 illustrates a timing chart in accordance with the first implementation of the invention.

FIG. 2 is a timing chart of the light emitting device control circuit device 100 illustrated in FIG. 1. The switching voltage Vs1 is a pulse signal, one cycle of which is Ts, and is provided to a gate terminal G of the transistor TR1. The switching voltage Vs1 becomes a low level from a high level at fall timing tsf1, and becomes a high level from a low level at rise timing tsr1. The transistor TR1 turns to ON state between fall timing tsf1 and rise timing tsr1 (=period Ts1). The transistor TR1 turns to OFF state during a period Ts except the period Ts1.

The pulse voltage Vp1 is provided to a drain terminal D of the transistor TR1 in response to the switching voltage Vs1. The pulse voltage Vp1 logically operates opposite to the switching voltage Vs1 (i.e., without a delay, both voltages change to opposite logic states). The rise timing tpr1 of the pulse voltage Vp1 and the fall timing Tsf1 of the switching voltage Vs1 are the same timing, and the fall timing tpf1 of the pulse voltage Vp1 and the rise timing tsr1 of the switching voltage Vs1 are the same timing. During the period Tp1, all of the light emitting devices A1 to A17 change to enable state (i.e., enabled) as for the pulse voltage supplying line Y1, although only enabled light emitting device as for the driving signals SP1 to SP17 can be driven. The enable state for the driving control line is a state in which the driving control lines X1 to X17 are supplied with a current. The enable state for the pulse voltage supplying line is a state in which the pulse voltage supplying lines Y1 to Y7 are supplied with a pulse voltage. An opposite state of the enable state is called a disable state. Supplying a pulse current to each of the light emitting devices is determined by the ON-OFF state of the switches S1 to S17, uniquely.

The driving signal SP1 is provided to the switch S1 from the controller 110. One cycle Tsp of the driving signal SP1 is same as one cycle Ts of the switching voltage Vs1 and one cycle Tp of the pulse voltage Vp1. With respect to the driving signal SP1, the switch S1 turns to ON state during the period Tsp1. The period Tsp1 is a high level period from rise timing tr1 to fall timing tf1. The rise timing tr1 is delayed for a delay time tdr by the controller 110, not to be same timing as the fall timing tsf1 of the switching voltage Vs1 and the rise timing tpr1 of the pulse voltage Vp1. Because of the delay tdr, the switch S1 turns to ON state after the pulse voltage Vp1 becomes a high level (i.e., a simultaneous drive of the transistor TR1 and the light emitting device A1 can be avoided). Therefore enough current to drive the light emitting device A1 by a pulse current (i.e., pulse current drive) can be supplied during the driving signal SP1 is at a high level. The delay time tdr is set by the controller 110. For example, a value of the delay time is set as few microseconds (e.g., 1 μs to 99 μs). ON timing of the transistor TR1 and ON timing of the switch S1 are shifted with respect to each other, then concentration of a pulse current to a specific timing can be prevented. Thus noise caused by increase of current can be prevented. In contrast, if rise timing tr1 of the driving signal SP1 is faster than the rise timing tpr1 of the pulse voltage Vp1, enough pulse current is not supplied to the light emitting device A1 and enough brightness can not be obtained.

The driving signal SP2 is provided from the controller 110 to the switch S2. One cycle of the driving signal SP2 is set to be the same as one cycle Ts of the switching voltage Vs1 and one cycle Tp of the pulse voltage Vp1 and one cycle Tsp of the driving signal SP1. The switch S2 is turned ON during the period Tsp2 of the driving signal SP2. The period Tsp2 equivalents to a high level period from rise timing tr2 to fall timing tf2. The rise timing tr2 is set not to be same timing as the fall timing tsf1 of the switching voltage Vs1 and the rise timing tpr1 of the pulse voltage Vp1 and the rise timing tr1 of the driving signal SP1. Thus, the rise timing tr2 is delayed for a time td1 compared to the rise timing tr1 of the driving signal SP1 by the controller 110. Thus, the timing to drive the light emitting device A2 by a pulse is delayed for a predetermined period (time) compared to the timing to drive the light emitting device A1. Therefore, an increase of noise in the specific timing can be prevented. The delay time td1 is set as a small value compared to the delay time td (e.g., td1 is set as a value of 1/10 compared to a value of td).

The driving signal SP16 is provided from the controller 110 to the switch S16. One cycle of the driving signal SP16 is set to be the same as one cycle Ts of the switching voltage Vs1, one cycle Tp of the pulse voltage Vp1, and one cycle of the driving signals SP1 to SP15. The switch S16 is turned ON during the period Tsp16 of the driving signal SP16. The period Tsp16 is the same as a high level period from the rise time tr16 to the fall time tf16. The rise timing tr16 is set not to be same timing as the fall timing tsf1 of the switching voltage Vs1, the rise timing tpr1 of the pulse voltage Vp1, the rise timing tr1 of the driving signal SP1, and the rise timing tr2 of the driving signal SP2. Also the rise timing 16 is shifted to each rise timing of the driving signals SP3 to SP15 (not illustrated in FIG. 2). The rise timing tr16 of the driving signal SP16 is delayed for time 15td1 (=a value of fifteen times of the delay time td1) compared to the rise timing tr1 of the driving signal SP1. Thus, a delay of the driving signal SP16 equals fifteen times of a delay between the rise timing tr1 of the driving signal SP1 and the rise timing tr2 of the driving signal SP2. Thus, the timing to drive the light emitting device A16 by a pulse is shifted from each drive timing of the light emitting devices A1 to A15 for a predetermined period (time), thus increasing of noise in a specific (same) timing can be prevented.

The driving signal SP17 is provided from the controller 110 to the switch S17. One cycle Tsp of the driving signal SP17 is set to be the same as one cycle Ts of the switching voltage Vs1, one cycle Tp of the pulse voltage Vp1, and one cycle of the driving signals SP1 to SP16. The switch S17 is turned ON during the period Tsp 17 of the driving signal SP17. The period Tsp17 equivalents a high level period from the rise timing tr17 to the fall timing tf17. The rise timing tr17 is set not to be same timing as the fall timing tsf1 of the switching voltage Vs1, the rise timing tpr1 of the pulse voltage Vp1, the rise timing tr1 of the driving signal SP1, the rise timing tr2 of the driving signal SP2, and the rise timing tr16 of the driving signal SP16. Also the rise timing tr17 is shifted to each rise timing of the driving signals SP3 to SP16 (not illustrated in FIG. 2). The rise timing tr17 of the driving signal SP17 is delayed for time 16td1 compared to the timing tr1 of the driving signal SP1. Thus, a delay of the driving signal SP16 equals sixteen times of a delay between the rise timing tr1 of the driving signal SP1 and the rise timing tr2 of the driving signal SP2. Thus, the timing to drive the light emitting device A17 by a pulse current (i.e., pulse current drive) is shifted from the drive timings of the light emitting devices A1 to A16, and an increase of noise in a specific (same) timing can be prevented.

Operations of the driving signals SP1, SP2, SP16, and SP17 are described above. Also, the driving signals SP3 to SP15 have the same characteristic regarding the shifting of time. For example, a driving signal SP10 (not illustrated) is provided to the switch S10 from the controller 110. If the driving signal SP10 is at a high level, the switch S10 is turned ON. A high level of the driving signal SP10 is set to be covered by the period Tp1 of the pulse voltage Vp1. The driving signal SP10 becomes a high level at rise timing tr10 (not illustrated), and becomes a low level at fall timing tf10 (not illustrated). The rise timing Tr10 of the driving signal SP10 is set not to be same timing with the rise timing tpr1 of the pulse voltage Vp1 and the rise timings of the driving signals SP1 to SP9 and SP11 to SP17. Thus drive timing of the light emitting device A10 by a pulse current (i.e., pulse current drive) is shifted compared to the drive timing of the light emitting devices A1 to A9 and A11 to A17, and an increase of noise in specific (same) timing can be prevented.

During the transistor TR1 is ON state (i.e., during the period Tp1), sequential drive of the switches S1 to S17 and supplying a current to the light emitting devices A1 to A17 with shifted timing with respect to each other is referred as time division drive (i.e., drive sequentially).

Some aspects of the first implementation of the disclosure are summarized below. The light emitting device control circuit device 100 includes the light emitting unit EU1 which has light emitting devices A1 to A17 including a first electrode and a second electrode, and includes driving control lines X1 to X17 which drive light emitting devices A1 to A17 by a pulse current (i.e., pulse current drive) with predetermined delay time td1 with respect to each other. The light emitting device control circuit device 100 also includes the pulse voltage supplying line Y1 to supply a pulse voltage Vp1 to the light emitting unit EU1. If the pulse supplying line Y1 is ON state (i.e., enable state), the light emitting devices A1 to A17 are driven with the delay time td1 with respect to each other.

Figure 3:
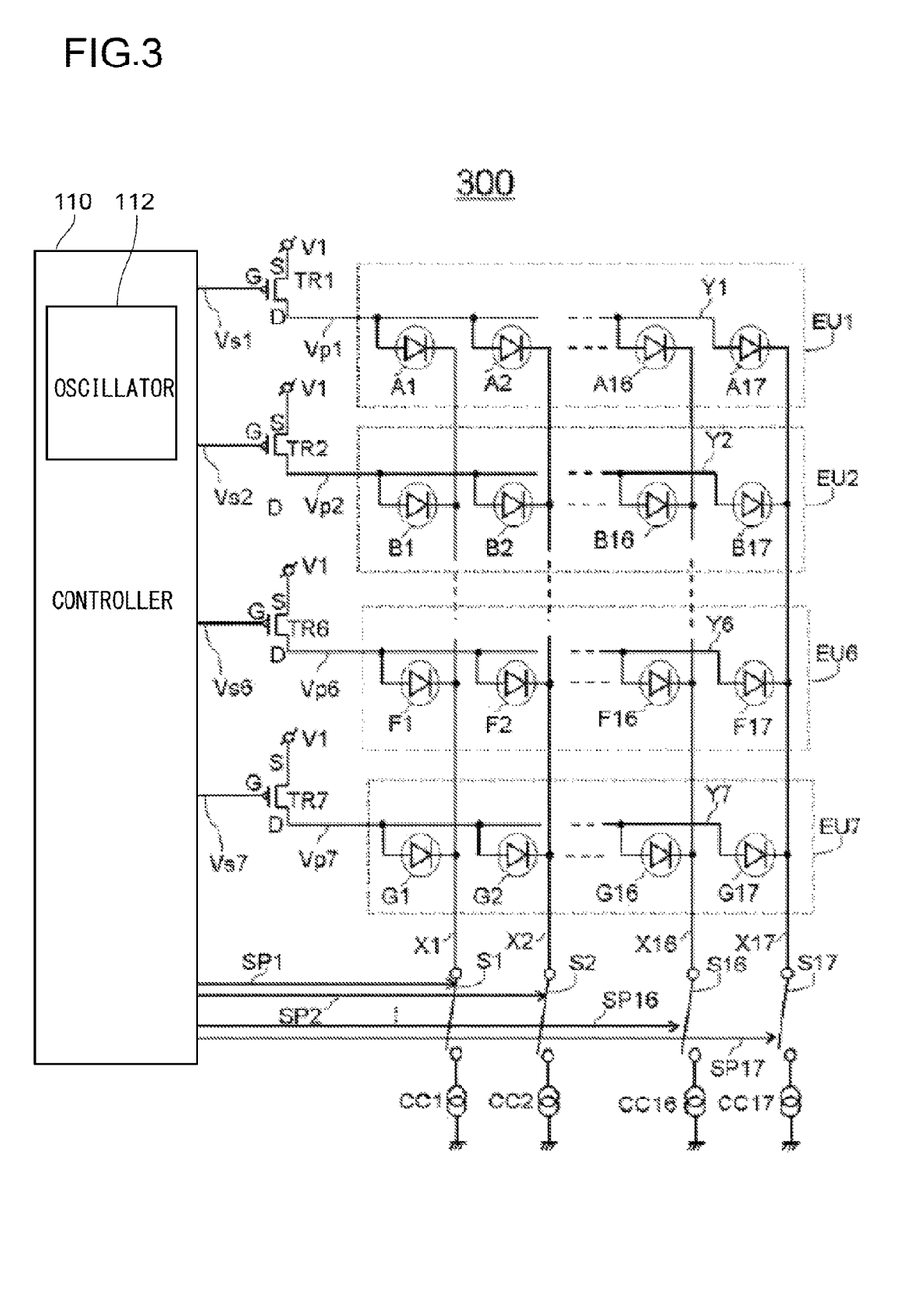
FIG. 3 illustrates a light emitting device control circuit device in accordance with a second implementation of the invention.

FIG. 3 illustrates a light emitting device control circuit device 300 in accordance with a second implementation of the disclosure. The light emitting device control circuit device 300 includes multiple light emitting units consisting of multiple light emitting devices (the word "light emitting unit" is used to separate multiple light emitting devices as specific block). Therefore, one independent part corresponding to "the light emitting unit" doesn't actually exist. In FIG. 3, as a first difference compared to FIG. 1, there are multiple (7 channels) light emitting units EU1 to EU7. As a second difference, there are transistors TR1 to TR7 to supply pulse voltages to the light emitting units. As a third difference, the pulse voltage supplying lines Y1 to Y7 are connected to each drain terminal D of the transistors TR1 to TR7. As a fourth difference, each of the light emitting units EU1 to EU7 is connected to the drive signal supplying lines X1 to X17. As a fifth difference, switching voltages Vs1 to Vs7 are provided to drive the transistors TR1 to TR7, respectively. As a sixth difference, the switches S1 to S17 are respectively connected to the drive signal supplying lines X1 to X17. Regarding the switches S1 to S17, the constant current sources CC1 to CC17, and the controller 110, the same components as the first implementation can be used.

The light emitting unit EU1 includes the light emitting devices A1 to A17 same as the first implementation. The light emitting unit EU2 includes light emitting devices B1 to B17. The light emitting units EU3 to EU5 (not illustrated) include the light emitting devices C1 to C17, D1 to D17, and E1 to E17, respectively. The light emitting unit EU6 includes the light emitting devices F1 to F17, and the light emitting unit EU7 includes the light emitting devices G1 to G17.

Switching voltages Vs1 to Vs7 (each of the voltages has same frequency and sequentially driven) are supplied to each gate terminal G of the transistors TR1 to TR7, respectively. Thus, the transistors TR1 to TR7 are not driven in the same timing, rather a delay time is set with respect to each other (the delay time is set so as to shift each of on/off timing of the transistors TR1 to TR7 mutually). For example, after the transistor TR1 is turned ON, the transistor TR2 is turned ON with a delay compared to the transistor TR1, and sequentially the transistors TR3 to TR7 are turned ON with a predetermined delay with respect to each other.

With respect to the light emitting device control circuit device 300, light emitting devices are provided as a m by n matrix pattern. Thus, light emitting devices are provided as 7 rows and 17 columns (i.e., 119 light emitting devices are provided). The pulse voltage supplying lines Y1 to Y7 are provided for the row direction, and the drive control lines X1 to X17 are provided for the column direction, respectively. The light emitting devices A1 to A17, B1 to B17, C1 to C17 (not illustrated in FIG. 3), D1 to D17(not illustrated in FIG. 3), E1 to E17(not illustrated in FIG. 3), F1 to F17, and G1 to G17 are provided to each cross point of the pulse voltage supplying lines and the drive control lines. A driver to drive thus construction using LEDs is referred to as a 7 by 17 LED matrix driver. This matrix drives is used to drive LEDs provided as a matrix at a key control part of a cell phone or back of a cell phone, and then a pattern design or a character are driven (i.e., a pattern or a character illuminate).

To drive the light emitting device A1 (i.e., allow the light emitting device A1 illuminate) composed of the light emitting unit EU1, both the voltage supplying line Y1 and the drive control line X1 are enabled. To drive the light emitting device A2, both the pulse voltage supplying line Y1 and the driving control line X2 are enabled. To drive the light emitting device A16, both the pulse voltage supplying line Y1 and the driving control line X16 are enabled. To drive the light emitting device A17, both the pulse voltage supplying line Y1 and the driving control line X17 are enabled.

The relation between the enable state and the disable state doesn't always correspond to the relation between a high level and a low level of both the pulse voltage supplying lines Y1 to Y7 and the driving control lines X1 to X17. However, as an example of an implementation of the disclosure, when both the pulse voltage supplying lines Y1 to Y7 and the driving control lines X1 to X17 are at a high level, then both of them change to enable state, respectively. When both the pulse voltage supplying lines Y1 to Y7 and the driving control lines X1 to X17 are at a low level, then both of them change to disable state, respectively.

To drive the light emitting device G1 composed of the light emitting unit EU7, both the voltage supplying line Y7 and the drive control line X1 are enabled. To drive the light emitting device G2, both the voltage supplying line Y7 the drive control line X2 are enabled. To drive the light emitting device G16, both the voltage supplying line Y7 and the drive control line X16 are enabled. To drive the light emitting device G17, both the voltage supplying line Y7 and the drive control line X17 are enabled.

Other light emitting units can be operated as the light emitting units EU1 and EU7. The light emitting device is driven (i.e., the light emitting device illuminates) located at a cross point of the enabled line among the pulse voltage lines Y1 to Y7 and the enabled line among the drive control lines X1 to X17. For example, the light emitting device B1 of the light emitting unit EU2 is driven if both of the pulse voltage supplying line Y2 and the drive control line X1 are enabled. The light emitting device F16 of the light emitting unit EU6 (not illustrated in FIG. 3) is driven if both of the pulse voltage supplying line Y6 and the drive control line X16 are enabled.

The characteristic of the light emitting device control circuit device in FIG. 3 is not to drive the light emitting devices simultaneously (i.e., all of the 119 light emitting devices are driven with shifted timing with respect to each other). In other words, ON-OFF timings of all of the 119 light emitting devices are shifted with respect to each other.

In contrast to the disclosure, if a delay time is not set for the pulse voltage supplying lines Y1 to Y7 and the drive control lines X1 to X17, all of the 119 light emitting devices are simultaneously turned ON or turned OFF. Then a current is generated at the same timing and an increase of noise occurs.

In contrast to the disclosure, if the delay time is only set for the pulse voltage supplying lines Y1 to Y7 in this order (i.e., the delay time is not set for the drive control lines X1 to X17), then the light emitting devices A1 to A17 connected to the pulse voltage supplying line Y1 are simultaneously turned ON or turned OFF. Then the light emitting devices B1 to B17 connected to the pulse voltage supplying line Y2 are simultaneously turned ON or turned OFF. Afterward, the light emitting devices G1 to G17 connected to the pulse voltage supplying line Y7 are simultaneously turned ON or turned OFF. In this situation, concentration of current is reduced to 1/7 compared to the situation without any delay for the voltage supplying lines. Therefore, although there is still some increase of noise, the amount of the increase of noise can be reduced.

In contrast to the assumptions of above, the light emitting device control circuit device 300 sets delays for both of the pulse voltage supplying lines Y1 to Y7 and the driving control lines X1 to X17. In other words, both of the voltage supplying lines Y1 to Y7 and the driving control lines X1 to X17 are controlled sequentially (i.e., time division drive). Thus all ON-OFF timings of the light emitting devices differ from each other, and significant concentration of current in a specific (i.e., the same) timing can be prevented significantly. Therefore significant generation of noise can be prevented.

Figure 4:
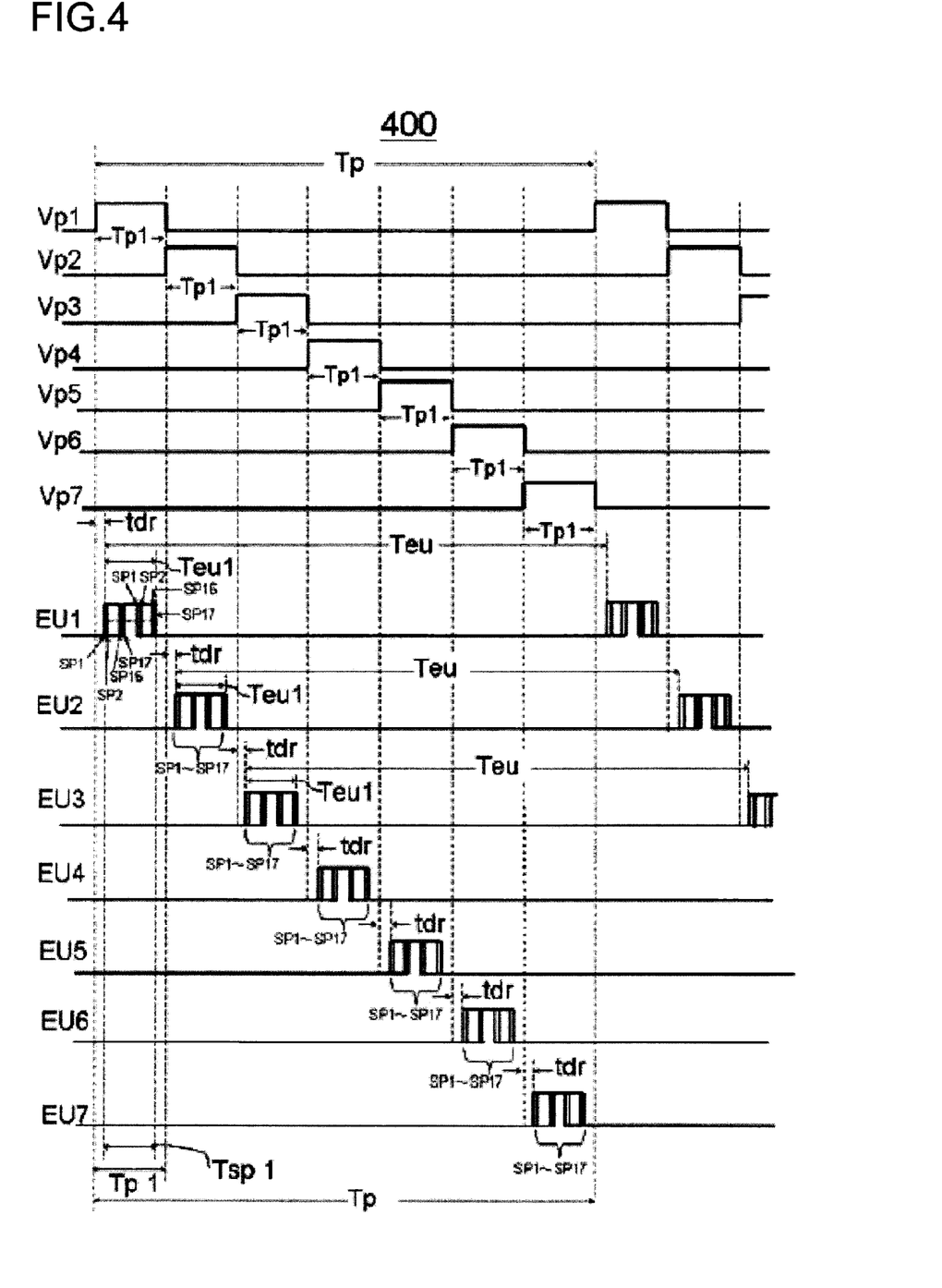
FIG. 4 illustrates a timing chart in accordance with the second implementation of the invention.

FIG. 4 is a timing chart of the light emitting device control circuit device 300 illustrated in FIG. 3. The pulse voltages Vp1 to Vp7 are provided to the pulse voltage supplying lines Y1 to Y7. The pulse voltages Vp3 to Vp5 and the light emitting units EU3 to EU5 are illustrated in FIG. 4, although they are not illustrated in FIG. 3.

The pulse voltage Vp1 is provided from a drain terminal D of the transistor TR1 to the light emitting unit EU1, which includes the light emitting devices A1 to A17. During one cycle Tp of the pulse voltage Vp1, the period Tp1 to drive light emitting devices A1 to A17 (i.e., allow them to change to enable state) composed of a light emitting unit EU1 is set. One cycle Tp of the pulse voltage Vp1 is set by the controller 110. An oscillator 112 is included in the controller 110. The cycle Tp of the pulse voltages Vp1 to Vp7 and the period Tp1 are determined based on one cycle of the reference clock signal clk provided from the oscillator 112. For example, if the reference oscillation frequency of the oscillator 112 (i.e., the reference clock signal clk) is set at 1 MHz, one cycle equals 1 μs. For example, the cycle Tp can be set at 4760 clk. In other words, the cycle Tp is set at 4.76 ms. A frequency of the cycle Tp equals 210 Hz. The period Tp1 is set at 680 clk (i.e., the period Tp1 is set at 0.68 ms). The length of the period Tp1 is set based on the number of the light emitting units (i.e., the number of the pulse voltages Vp1 to Vp7). In this implementation the number of the light emitting units EU1 to EU7 is seven, and the period Tp1 equals 1/7 of one cycle Tp. Therefore, the period Tp1 equals Tp/7, which equals 4.76 ms/7, i.e., equals 0.68 ms.

The pulse voltages Vp1 to Vp7 are set to the same condition except being driven at shifted timing (i.e., driven sequentially) from each other. Thus, the cycle Tp and the period Tp1 of these pulse voltages are set to be the same as each other. Same as the pulse voltage Vp1 is provided from a drain terminal D of the transistor TR1, pulse voltages Vp2 to Vp7 are provided from each drain terminal of the transistors TR2 to TR7. If the pulse voltage Vp1 rises, the pulse voltages Vp2 to Vp7 rise sequentially. Thus, the previous pulse voltage rises up, then the next pulse voltage rises up with the delay (Tp1). Thus, the pulse voltages are controlled by the controller 110 to operate sequentially (i.e., time division drive). If the pulse voltage Vp7 to drive the light emitting unit EU7 becomes a low level from a high level, the pulse voltage Vp1 becomes a high level from a low level again, then the light emitting unit EU1 is enabled.

FIG. 4 illustrates pulse voltages Vp1 to Vp7 and a period Teu1 when the light emitting units EU1 to EU7 are enabled.

During the period Teu1, the driving signals SP1 to SP17 (illustrated in FIG. 2) are generated by the controller 110. The light emitting units EU1 to EU7 are controlled with a cycle Teu, respectively. The light emitting units EU1 to EU7 are enabled while the pulse voltages Vp1 to Vp7 are at a high level (i.e., the period Tp1). Thus, the light emitting unit EU1 turns to enable state during the period Tp1 of the pulse voltage Vp1. The light emitting unit EU2 turns to enable state during the period Tp1 of the pulse voltage Vp2. The light emitting units EU3 to EU7 change to enable state during the respective period Tp1 of the pulse voltages Vp3 to Vp7.

The controller 110 sets the period Teu1 to drive the light emitting units EU1 to EU7. This period Teu1 is shorter than the period Tp1 which is set for the pulse voltages Vp1 to Vp7 (i.e., Teu1<Tsp1). For example, if the period Tp1 is set at 680 clk, the period Teu1 is set at 635 clk. Thus, if a frequency of the reference clock signal clk is 1 MHz (i.e., one cycle of the clock is 1 μs), the difference between the period Tp1 and the Teu1 is set at 45 μs (i.e., 680−635=45 clk=45 μs). Between the rise timing of the pulse voltages Vp1 to Vp7 and each drive timing of the light emitting units EU1 to EU7, the delay time tdr is set to drive the light emitting unit EU1 to EU7 without failure. The delay time tdr is set by the controller 110, and the length is set at 20 clk. The delay time tdr is set in accordance with the number of the light emitting units and the number of the light emitting devices installed in the light emitting unit.

As above mentioned, each of the light emitting units EU1 to EU7 includes seventeen light emitting devices. Each seventeen light emitting device included in the light emitting units is driven with a predetermined delay with respect to each other. With respect to the light emitting device control circuit device 300 as matrix pattern illustrated in FIG. 3, a delay of 1 clk is set to drive a neighboring light emitting device. In other words, with respect to seventeen channel drivers (i.e., if the light emitting unit includes seventeen light emitting device), there is a sixteen-microseconds (16 μs) delay between the first driven light emitting device and the last driven light emitting device. Thus, the period Tp1 is set in accordance with not only the number of the light emitting units but also the channel number of the light emitting units (i.e., the number of the light emitting devices installed in the light emitting unit).

In this implementation, a frequency of the reference clock signal clk is set at 1 MHz. This reference clock signal clk can be provided from outside the controller 110 without using the oscillator 112. Whether or not the oscillator 112 is used, a frequency or a cycle of the reference clock signal clk can be properly set. For example, the frequency of the reference clock signal clk can also be set from 200 KHz to 10 MHz. If a frequency of the reference clock signal clk is set at 200 KHz (i.e., one cycle of the reference clock is 5 μs), and if the cycle Tp is set by the number of the clock pulse and the number is set at 4760 clk, the cycle Tp of the pulse voltages Vp1 to Vp7 is calculated as "5 μs*4760=23.8 ms" (i.e., the frequency of the Tp equals 42 Hz). If a frequency of the reference clock signal of the oscillator 112 is set at 10 Mz (i.e., one cycle of the reference clock signal is 0.1 microseconds), and if the number of the cycle Tp is set by the number of the clock pulse and the number is set at 4760 clk, the cycle Tp of the pulse voltages Vp1 to Vp7 is calculated as "0.1 μs*4760=0.476 ms" (i.e., the frequency of the Tp equals 2.1 KHz).

As described above, with respect to a light emitting device control circuit device to drive light emitting devices sequentially (i.e., time division drive), a frequency of a pulse voltage (a voltage supplied to an anode terminal) and a frequency of a pulse current (a current supplied to a cathode terminal) are set properly. In the disclosure, a frequency of the oscillator 112 of the controller 110 is set at 1 MHz (i.e., one cycle of the reference clock is 1 ms) and one cycle Tp is set at 4760 clk, therefore the period Tp equals 4.76 ms (i.e., one frequency of the cycle Tp is 210 Hz). A frequency of the oscillator 112 can be set at a high frequency. If a frequency of the oscillator 112 is set at low frequency, a flicker of the light emitting device or a display can be caused. The flicker relates to a frequency of Japanese commercial power source (i.e., 50 Hz to 60 Hz), so it is desirable to drive the light emitting device (or the light emitting unit) more than 50 times in one second. In other words, it is preferable that the driving cycle of the light emitting device is set to 0.2 ms or less).

The disclosure makes it possible to drive all light emitting devices composed of a light emitting device control circuit device at times shifted with respect to each other. Therefore, the timing of the peak current is shifted, and a sudden fall of a power supply can be prevented. Thus, the construction can prevent noise caused by an increasing of energy consumption.

As for the light emitting device control circuit device of the disclosure, a voltage or a current shifted with respect to each other for a predetermined time are supplied to the light emitting device (i.e., the light emitting device is driven sequentially by time division drive), concentration of a current in a specific (i.e., the same) timing caused by turning ON the light emitting devices simultaneously, can be prevented. Thus, a problem of increased noise, caused by switching the light emitting devices simultaneously, can be prevented, and the light emitting control circuit device can be applied to other industrial applications.

A number of implementations of the invention have been described. Nevertheless, various modifications can be made without departing from the spirit and scope of the invention. Accordingly, any other implementations are within the scope of the claims.

LIST OF REFERENCE NUMERALS

100,300 light emitting device control circuit device
110 controller
112 oscillator
A1-A17,B1-B17,C1-C17,D1-D17,E1-E17,F1-F17,G1-G17 light emitting device
CC1-CC17 constant current source
EU1-EU7 light emitting unit
S1-S17 switch
SP1-SP17 driving signal
TR1-TR7 transistor
V1 power source
Vs1-Vs7 switching voltage
Vp1-Vp7 pulse voltage
X1-X17 driving control line
Y1-Y7 pulse voltage supplying line

What is claimed is:

1. A light emitting device control circuit device comprising:
   multiple drive control lines to perform a pulse current drive for a multiple light emitting devices respectively with a predetermined interval; and
   a pulse voltage supplying line to supply a pulse voltage which changes to ON state or OFF state to the multiple light emitting devices;
   wherein the multiple light emitting devices are driven with a predetermined delay with respect to each other during the ON state of the pulse voltage supplying line, wherein the light emitting devices form a light emitting unit, multiple light emitting units are provided, the multiple pulse voltage supplying lines are provided in correspondence with the number of the light emitting units, the multiple light emitting devices forming the multiple light emitting units are mutually connected to respective corresponding drive control lines, and the pulse voltages are sequentially supplied to the light emitting units with a predetermined delay from respective pulse voltage supplying lines, and
   illuminating periods of the light emitting same light emitting unit are so set as to occur with a small delay relative to and an overlap between one another, and driving of different light emitting units so proceeds that, after the driving of one light emitting unit is completed, the driving of a subsequent light emitting unit is started.

2. The light emitting device control circuit device according to claim 1, wherein the multiple pulse voltage supplying lines and the multiple drive control lines are implemented as a m by n matrix pattern (where m and n are integers equal to or greater than two), the light emitting devices are disposed at respective cross points between the m rows of the pulse voltage supplying lines and the n columns of the drive control lines, wherein pulse currents to perform the pulse current drive for the light emitting devices provided for the light emitting units are supplied to the respective n columns of the drive control lines.

3. The light emitting device control circuit device according to claim 1, wherein the light emitting device is a single semiconductor device.

4. The light emitting device control circuit device according to claim 1, wherein a cycle of the pulse voltage is equal to or less than 20 milliseconds (ms).

5. The light emitting device control circuit device according to claim 1, wherein each of the drive control lines has a constant current source to supply a current to the light emitting device, and a switch to turn ON or turn OFF an operation of the constant current source, wherein the constant current source and the switch are connected in series.

6. The light emitting device control circuit device according to claim 5, wherein the switch is turned ON or turned OFF by a pulse width modulation signal, and the pulse current is a pulse width modulated current.

7. The light emitting device control circuit device according to claim 1, wherein a first timing of the pulse current drive to the multiple light emitting devices is later by a predetermined period than a timing at which the pulse voltage supplying line is turned ON.

8. The light emitting device control circuit device according to claim 7, wherein last timing of the pulse current drive to the multiple light emitting devices is earlier by a predetermined period than a timing at which the pulse voltage supplying line is turned OFF.

9. The light emitting device control circuit device according to claim 1 further comprising:
   a P type transistor which has a first primary electrode, a second primary electrode, and a control electrode; and
   wherein a direct voltage is supplied to the first primary electrode, a pulse switching voltage is supplied to the control electrode, and the pulse voltage is provided from the second primary electrode.

10. The light emitting device control circuit device according to claim 9, wherein the P type transistor is a P channel MOS transistor, the first primary electrode is a source, the second primary electrode is a drain, and the control electrode is a gate.

11. The light emitting device control circuit device according to claim 9, wherein the P type transistor is a PNP bipolar transistor, the first primary electrode is an emitter, the second primary electrode is a collector, and the control electrode is a base.

\* \* \* \* \*